(12) United States Patent
Jaisle

(10) Patent No.: US 6,846,167 B2
(45) Date of Patent: Jan. 25, 2005

(54) TURBOCHARGER WITH MAGNETIC BEARING SYSTEM THAT INCLUDES DAMPERS

(75) Inventor: Jens-Wolf Jaisle, Stuttgart (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 10/643,195

(22) Filed: Aug. 18, 2003

(65) Prior Publication Data

US 2004/0037716 A1 Feb. 26, 2004

(30) Foreign Application Priority Data

Aug. 20, 2002 (EP) .............................................. 02018633

(51) Int. Cl.[7] .......................... F02B 39/00; F01D 25/16; F16C 27/06; F16C 32/04; F16C 39/06
(52) U.S. Cl. ...................... 417/407; 310/90.5; 384/624; 415/111; 415/213.1
(58) Field of Search ...................... 60/605.1; 123/559.1; 417/407; 310/90.5; 384/624; 415/58.5, 111, 213.1

(56) References Cited

U.S. PATENT DOCUMENTS

| | | | | | |
|---|---|---|---|---|---|
| 5,521,448 A | * | 5/1996 | Tecza et al. | ................ | 310/90.5 |
| 5,752,774 A | * | 5/1998 | Heshmat et al. | ............ | 384/624 |
| 5,910,695 A | * | 6/1999 | Lotz | .......................... | 310/90.5 |

* cited by examiner

*Primary Examiner*—Sheldon J Richter
(74) *Attorney, Agent, or Firm*—Pendorf & Cutliff; Greg Dziegielewski

(57) ABSTRACT

The invention relates to an exhaust gas turbocharger (1) having a housing and having a shaft (2) which is arranged so as to be capable of rotating about its longitudinal axis in the housing and on which a turbine wheel (4) and a compressor wheel (3) are seated and which is guided in radial bearings (5, 6) and in at least one axial bearing (9), the radial bearings (5, 6) being embodied as passive, permanent-magnetic bearings which each have a bearing plate (12, 16) which is seated on the shaft (2) as a rotor, and at least one stator (19, 20, 21, 22) which is disposed axially opposite to said rotor. In order to achieve a radial oscillation damping of the shaft (2) in a simple manner, it is proposed according to the invention that a resilient element (60, 61) is disposed between the stator (19, 20, 21, 22) and a part (37, 38) which is fixed to the housing.

10 Claims, 2 Drawing Sheets

TURBOCHARGER WITH MAGNETIC BEARING SYSTEM THAT INCLUDES DAMPERS

BACKGROUND OF THE INVENTION

1. Field of the Invention

The invention relates to an exhaust gas turbocharger having a housing and having a shaft which is arranged so as to be capable of rotating about its longitudinal axis in the housing and on which a turbine wheel and a compressor wheel are seated and which is guided in radial bearings and in at least one axial bearing, the radial bearings being embodied as passive, permanent-magnetic bearings each having a bearing plate which is seated, as a rotor, on the shaft, and at least one stator which is disposed axially opposite to said rotor.

2. Description of the Related Art

Exhaust gas turbochargers are used to improve the efficiency, and thus increase the performance, of internal combustion engines. They have a shaft which is provided at one end with a turbine wheel and at the other end with a compressor wheel. The turbine wheel has the exhaust gas stream of the internal combustion engine applied to it, essentially part of the thermal energy of the exhaust gas being converted into a rotary movement by the turbine wheel. The compressor wheel is driven by means of the shaft, sucks in fresh air and allows it to flow under excess pressure into the inlet ducts of the internal combustion engine, thus improving the volumetric efficiency.

Stringent demands are made of the bearings of the shaft of exhaust gas turbochargers. On the one hand, the shaft reaches high rotational speeds of up to 300,000 rpm. On the other hand, the exhaust gas turbocharger, and thus its bearings, is exposed to high temperatures. A further problem is that the exhaust gas stream which strikes the turbine wheel generates strong axial forces which have to be absorbed in an axial bearing. Owing to the high rotational speeds, the rotating parts of the exhaust gas turbocharger must balanced highly precisely so that as few oscillations and vibrations as possible are generated. In addition, it is also necessary to ensure that the very wide temperature range in which an exhaust gas turbocharger operates does not lead to stresses in the bearings owing to material expansion.

Previously, plain bearings or roller bearings were exclusively applied as bearings for the shaft. Owing to the above-mentioned stresses, they are subject to considerable wear and they are responsible, along with their lubrication, for up to approximately 80% of failures of exhaust gas turbochargers. In comparison, a magnetic bearing of the shaft provides the advantage that it is possible to dispense with the use of oil as lubricant. As a result, strict exhaust gas standards for vehicles can be complied with and the reliability of turbochargers can be increased. Furthermore, magnetic bearings provide the advantage of reducing or even avoiding the need to balance the rotating components as these bearings keep the rotor on its center-of-gravity axis. However, in one respect, magnetic bearings are inferior to the conventional oil-lubricated plain or roller bearings—they have virtually no damping. This is absolutely necessary in order to damp excitations from the outside, for example caused by the internal combustion engine, and to limit the radial movement of the rotor to the play which is predefined by the radial gaps which are present. The damping must be effected by additional structural measures.

SUMMARY OF THE INVENTION

The invention therefore has the object to configure the bearing of an exhaust gas turbocharger in such a way that, when permanent-magnetic radial bearings are used, sufficient damping of radial movements of the rotor is achieved.

In order to achieve this object, the combination of features specified in patent claim 1 is proposed. Advantageous embodiments and refinements of the invention result from the dependent claims.

According to the invention, it is proposed that a resilient element for radially damping oscillation movements of the shaft be arranged between each stator and a part which is fixed to the housing. The resilient element is subjected to pressure by radial movements of the stator and in this way impedes the radial movements of the shaft and has a damping effect.

The part which is fixed to the housing can be formed by a housing plate with a flange projection which projects axially beyond the stator, the resilient element being preferably connected in a gap-less configuration to a radially outwardly lying surface of the stator with one end, and to a radially inwardly lying surface of the part which is fixed to a housing with the other.

The stator is preferably embodied as a yoke which is U-shaped in cross section and surrounds the rotor axially and radially, and two radial bearings may be provided, between which at least one axial bearing is arranged. The radial bearings within the turbocharger should have a distance between them that is as large as possible in order to provide a large leverage against possible tilting movements of the shaft. A positive system rigidity, i.e. a stable radial bearing system, is obtained for bearing distances which are greater than the average diameter of the bearing rings.

In one preferred embodiment of the invention, the resilient element is embodied as a cylindrical ring which is arranged coaxially with respect to the shaft. As a result, a uniform damping effect is achieved over the entire circumference. The oscillations or vibrations in the rotating parts which occur while the turbocharger is operating depend, inter alia, on their mass and mechanical rigidity. This requires a specific spring stiffness and damping constant of the resilient element, which can be made available by suitably selecting the material composition of the element. The resilient element preferably has a spring stiffness between 200 kN/m and 600 kN/m as well as a damping constant between 100 kg/s and 300 kg/s. These values can readily be achieved if the resilient element is composed of a plastic material, preferably of rubber material.

BRIEF DESCRIPTION OF THE DRAWINGS

The invention is explained below in more detail by reference to an exemplary embodiment which is illustrated schematically in the drawings, in which.

DETAILED DESCRIPTION OF THE INVENTION

Figure 1:
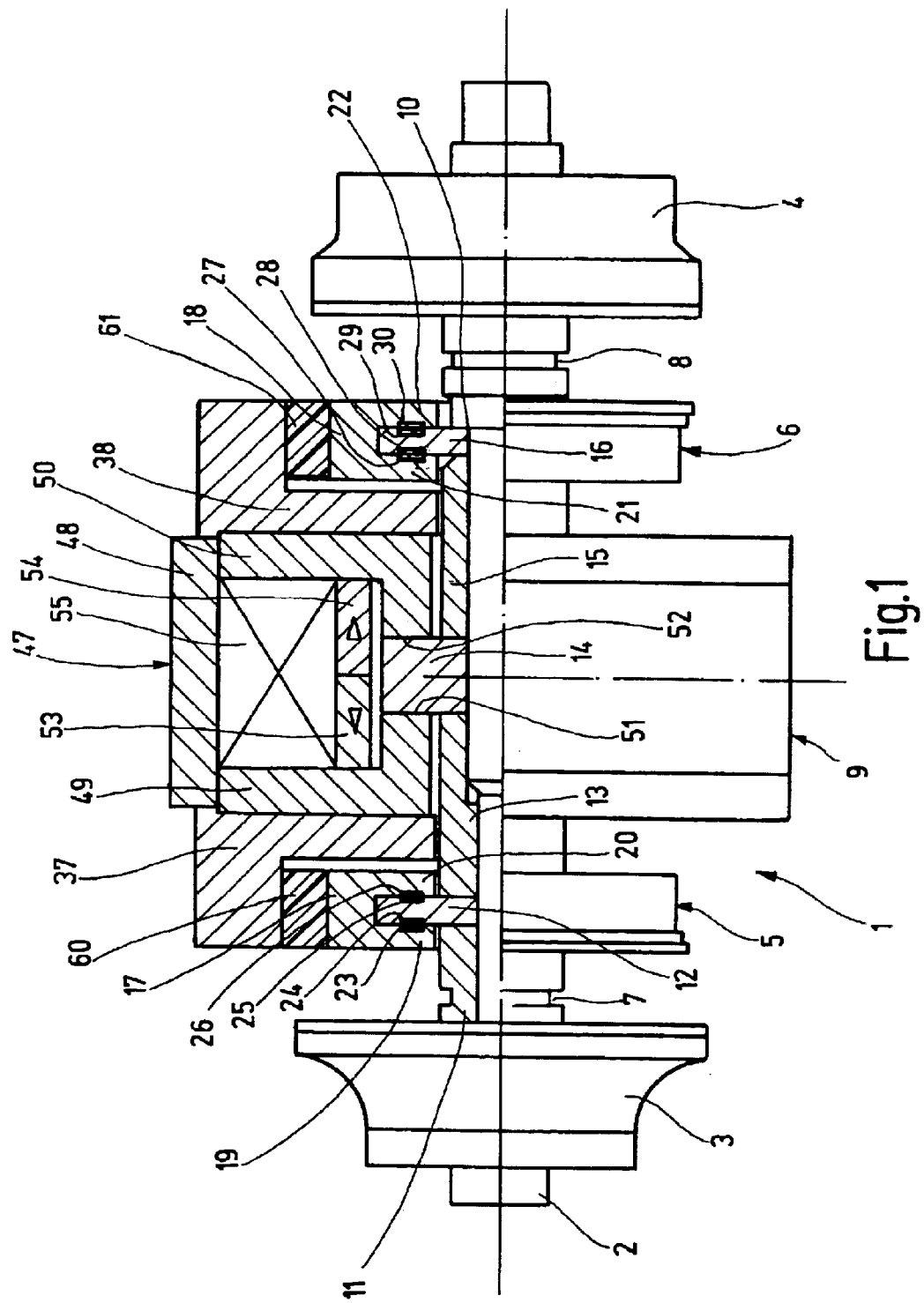
FIG. 1 shows a side view of an exhaust gas turbocharger without its housing, the upper part being shown partially sectioned.

The exhaust gas turbocharger 1 which is illustrated in FIG. 1 has a shaft 2 at the left end of which a compressor wheel 3 is seated and at the right end of which a turbine wheel 4 is seated. The compressor wheel 3 is embodied as a radial compressor in a manner known per se.

Between the compressor wheel 3 and the turbine wheel 4 there are two radial bearings 5, 6. The radial bearings 5, 6 are adjacent to the compressor wheel 3 and the turbine wheel 4, respectively. Between them there are grooves 7, 8 which serve to hold sealing rings, said rings forming limiting bearings with a typical play of approximately ±0.15 mm. Between the radial bearings 5, 6 there is an axial bearing 9.

As is apparent from the upper part of FIG. 1, the shaft 2 is surrounded by a total of six rings which are clamped axially against a collar 10 on the shaft 2. A first shaft sleeve 11 with the groove 7 is followed by a bearing plate 12, a second shaft sleeve 13, a bearing plate 14, a third shaft sleeve 15 and a further bearing plate 16.

The bearing plates 12, 16 are associated with the radial bearings 5, 6. They are each held at their two ends by a yoke 17, 18 which is U-shaped in cross section and coaxially surrounds the shaft 2, each yoke 17, 18 having a pair of radial bearing stators 19, 20 and 21, 22 which form the limbs of the yokes 17, 18. The radial bearing stators 19, 20, 21, 22 and the bearing plates 12, 16 have permanent magnets 23, 24, 25, 26 and 27, 28, 29, 30 which are located axially opposite to one another in the two radial bearings 5, 6. They are polarized in such a way that they attract one another, so that an axially directed and attracting magnet field is present in the gaps between the bearing plates 12, 16 and the radial bearing stators 19, 20, 21, 22. The magnetic fields center the shaft 2, a radial stiffness of, for example, 160 kN/m being achieved.

Figure 2:
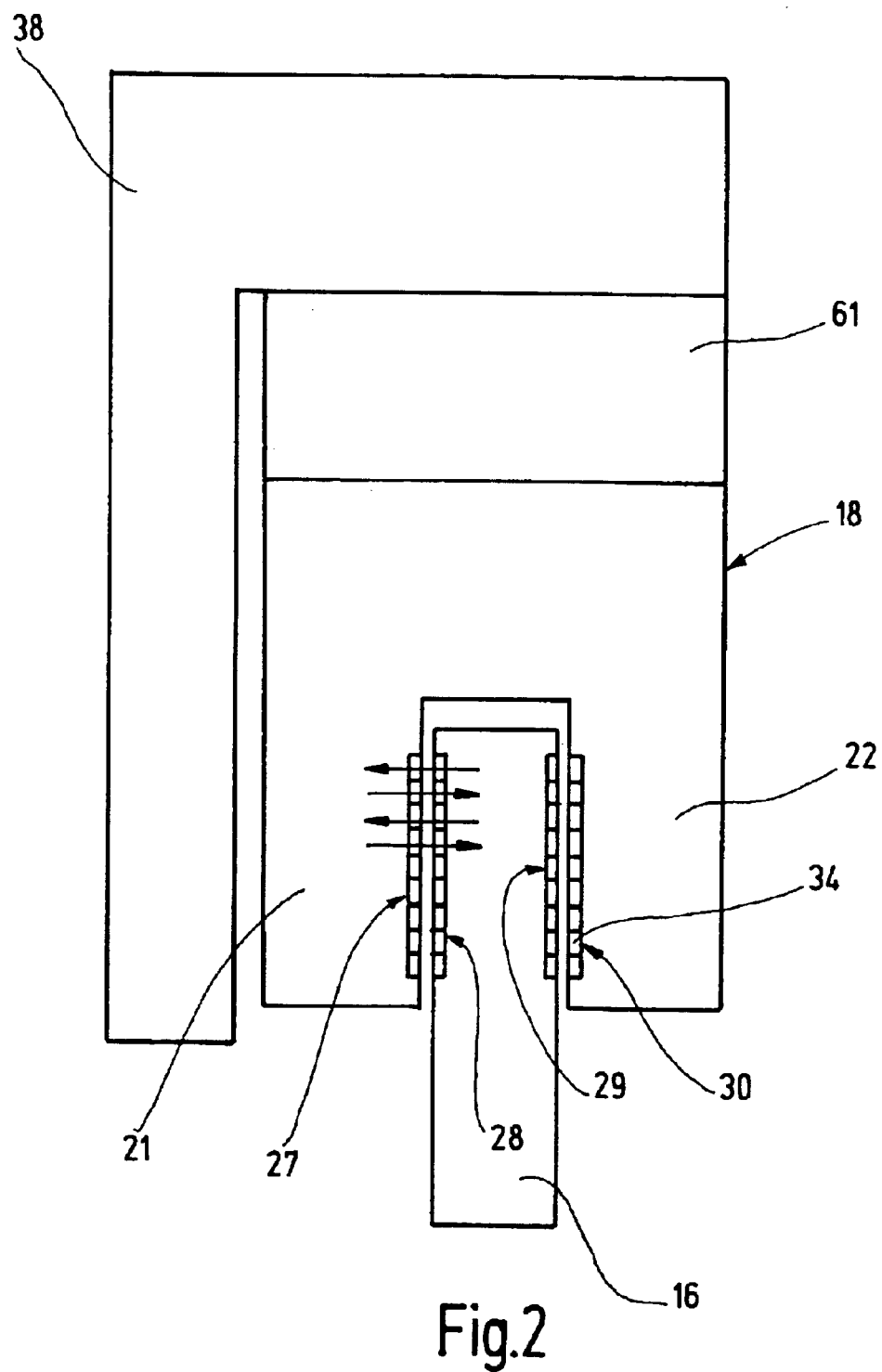
FIG. 2 shows a cross section through a radial bearing of the exhaust gas turbocharger according to FIG. 1.

The permanent magnets 23 to 30 are composed of nine ring magnets 34 which are positioned coaxially one inside the other, as is apparent from the enlarged representation of the radial bearing 6 in FIG. 2. The ring magnets 34 of a permanent magnet 23 to 30 bear against one another without gaps in the radial direction. Ring magnets 34 which are adjacent in the radial direction have opposed magnetization in the axial direction. The axially opposed ring magnets 34 of two adjacent permanent magnets 23 to 30 are polarized so as to attract one another, so that an axial magnetic flux is produced.

The yokes 17, 18 are surrounded radially on the outside by resilient elements 60, 61 which are embodied as cylindrical rings made of plastic material. In order to be able to damp as effectively as possible oscillations which occur, the rings 60, 61 are, on the one hand, connected to the radially outward oriented surface of the yokes 17, 18 and, on the other hand, to the radially inner surface of a flange of housing plates 37, 38, which flange engages axially over the yokes 17, 18. The housing plates 37, 38 are connected to the housing (not illustrated in more detail in the drawing) of the turbocharger. The rings 60, 61 have pressure applied to them by radial movements of the yokes 17, 18 and in this way damp the radial movement. The spring stiffness of the rings 60, 61 is in the region of 200 kN/m to 600 kN/m. The damping constant of the rings 60, 61 is approximately 100 kg/s to 300 kg/s.

The bearing plate 14 is associated with the axial bearing 9. It is held on both sides by an annular yoke 47 made of laminated SI iron. The annular yoke 47 is held between the two housing plates 37, 38 and secured there. It has an outer yoke casing 48 from which two inwardly directed yoke limbs 49, 50 emerge which have an L-shaped cross section and embrace the bearing plate 14 with limb sections which are directed toward one another, resulting in two magnet gaps 51, 52. Adjacent to the circumferential side of the bearing plate 14 there are two permanent magnets 53, 54 lying axially one next to the other within the annular yoke 47, said permanent magnets 53, 54 having opposed axial polarization—symbolized by the triangles. They bear one against the other and against the yoke limbs 49, 50. They are surrounded by an electromagnetic annular coil 55 which fills the space between the permanent magnets 53, 54 and between the yoke casing 48 and the yoke limbs 49, 50.

Owing to the magnetic instability of the shaft 2 in the axial direction, axial stabilization must be brought about by means of the axial bearing 9. This is done when there is an axial deflection of the bearing plate 14 by virtue of the fact that this deflection is sensed by a sensor (not illustrated here in more detail) which is known in the prior art and, as a result, a regulator (not illustrated either) controls the flow of current to the annular coil 55 in such a way that an additional magnetic flux is generated, which magnetic flux leads overall to an asymmetrical distribution of magnetic flux within the axial bearing 9 which counteracts the deflection of the bearing plate.

What is claimed is:

1. An exhaust gas turbocharger (1) having a housing and having a shaft (2) which is arranged so as to be capable of rotating about its longitudinal axis in the housing and on which a turbine wheel (4) and a compressor wheel (3) are seated and which is guided in radial bearings (5, 6) and in at least one axial bearing (9), the radial bearings (5, 6) being passive permanent-magnetic bearings which each have a bearing plate (12, 16) which is seated, as a rotor, on the shaft (2), and at least one stator (19, 20, 21, 22) which is disposed axially opposite to said rotor, wherein a resilient element (60, 61) is arranged between each stator (19, 20, 21, 22) and a part (37, 38) which is fixed to the housing in order to radially damp oscillation movements of the shaft (2).

2. The exhaust gas turbocharger according to claim 1, wherein the part (37, 38) which is fixed to the housing is a housing plate with a flange projection which projects axially beyond the stator (19, 20, 21, 22).

3. The exhaust gas turbocharger according to claim 1, wherein the resilient element (60, 61) is connected without a gap to a radially outwardly lying surface of the stator (19, 20, 21, 22) at one end, and to a radially inwardly lying surface of the part (37, 38) which is fixed to the housing at the other.

4. The exhaust gas turbocharger according to claim 1, wherein the resilient element (60, 61) is a cylindrical ring which is arranged coaxially with respect to the shaft (2).

5. The exhaust gas turbocharger according to claim 1, wherein the resilient element (60, 61) has a spring stiffness between 200 kN/m and 600 kN/m.

6. The exhaust gas turbocharger according to claim 1, wherein the resilient element (60, 61) has a damping constant between 100 kg/s and 300 kg/s.

7. The exhaust gas turbocharger according to claim 1, wherein the resilient element (60, 61) is a plastic material.

8. The exhaust gas turbocharger according to claim 1, wherein the stator (19, 20, 21, 22) is yoke (17, 18) which is U-shaped in cross section and surrounds the rotor axially and radially.

9. The exhaust gas turbocharger according to claim 1, wherein there are two radial bearings (5, 6) between which there is disposed at least one axial bearing (9).

10. The exhaust gas turbocharger according to claim 1, wherein the resilient element (60, 61) is a rubber material.

* * * * *